US 11,432,348 B2

(12) United States Patent
Albasheir et al.

(10) Patent No.: US 11,432,348 B2
(45) Date of Patent: Aug. 30, 2022

(54) SELECTING LOCAL GATEWAYS FOR VOWIFI AND VIWIFI

(71) Applicant: T-Mobile USA, Inc., Bellevue, WA (US)

(72) Inventors: Suliman Albasheir, Sammamish, WA (US); Muhammad W. Afzal, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/101,335

(22) Filed: Nov. 23, 2020

(65) Prior Publication Data

US 2022/0167437 A1 May 26, 2022

(51) Int. Cl.
| | |
|---|---|
| *H04W 76/11* | (2018.01) |
| *H04W 64/00* | (2009.01) |
| *H04W 48/20* | (2009.01) |
| *H04W 84/12* | (2009.01) |

(52) U.S. Cl.
CPC ............ *H04W 76/11* (2018.02); *H04W 48/20* (2013.01); *H04W 64/00* (2013.01); *H04W 84/12* (2013.01)

(58) Field of Classification Search
CPC .......... G06Q 30/0261; H04W 12/08

USPC ........ 455/435.1; 370/230; 709/224
See application file for complete search history.

(56) References Cited

U.S. PATENT DOCUMENTS

| | | | | |
|---|---|---|---|---|
| 2013/0065585 | A1* | 3/2013 | Pelletier ............ | G06Q 30/0267 455/435.1 |
| 2013/0070667 | A1* | 3/2013 | Ku ...................... | H04L 65/1016 370/328 |
| 2013/0232565 | A1* | 9/2013 | O'Connor .......... | H04L 63/0227 726/13 |
| 2017/0111315 | A1* | 4/2017 | Long .................. | H04L 61/2061 |

* cited by examiner

*Primary Examiner* — Kiet M Doan

(57) ABSTRACT

Selecting local gateways for VoWiFi and/or ViWiFi calls (voice traffic sessions) for a user equipment (UE) includes: receiving, by a routing node (evolved packet data gateway (ePDG)), a request to initiate the voice traffic session for the UE from a wireless node (WiFi router) communicatively coupled with the UE, the wireless node outside a cellular network; based on at least an internet protocol (IP) address of the wireless node or the UE, determining a geographical location of the UE; based on at least the geographical location of the UE, determining a tracking area code; based on at least the tracking area code, determining an IP address of a network gateway (user plane function (UPF) or packet data gateway (PGW) user plane function (PGW-U), and session management function (SMF) node or PGW control plane function (PGW-C)) proximate to the UE; and establishing the voice traffic session using the network gateway.

17 Claims, 5 Drawing Sheets

SELECTING LOCAL GATEWAYS FOR VOWIFI AND VIWIFI

BACKGROUND

Some cellular devices (user equipment, UEs) are able to place voice or video calls using a WiFi router (e.g., voice over WiFi, VoWiFi, or video over WiFi, ViWiFi), such as a router owned by the cellular device user and connected to the internet using the user's internet service provider (ISP). Because the WiFi router is outside the control of the cellular carrier, it is outside of the cellular network's zone of trust. Therefore, in order for the call to enter the cellular network, it passes through an evolved packet data gateway (ePDG). An ePDG interfaces with untrusted internet protocol (IP) systems, and acts as a secure termination node for IP security (IPsec) protocol tunnels established with UEs. The call is routed by the ePDG to a network gateway.

At some point, a call initiated over WiFi may experience a hand-off to the cellular network. The cellular network will handle the call using a network gateway proximate to (nearby) the UE. It is preferable for the gateway use the same network gateway for the VoWiFi or ViWiFi phase of the call as for the later cellular phase. However, this is unlikely to occur if, when the VoWiFi or ViWiFi call is initiated, the ePDG does not know the location of the UE, and instead assigns the VoWiFi or ViWiFi call to a network gateway randomly.

SUMMARY

The following summary is provided to illustrate examples disclosed herein, but is not meant to limit all examples to any particular configuration or sequence of operations.

A solution is disclosed for selecting local gateway for a voice over WiFi (VoWiFi) and/or a video over WiFi (ViWiFi) calls for a user equipment (UE). A solution includes: receiving, by a routing node (e.g., an evolved packet data gateway (ePDG)), a request to initiate the voice traffic session for the UE from a wireless node (e.g., a WiFi router) communicatively coupled with the UE, the wireless node outside a cellular network; based on at least an internet protocol (IP) address of the wireless node or the UE (e.g., the internet address, rather than an address assigned by the cellular network), determining a geographical location of the UE; based on at least the geographical location of the UE, determining a tracking area code; based on at least the tracking area code, determining an IP address of a network gateway (e.g., a user plane function (UPF) or a packet data gateway (PGW) user plane function (PGW-U), and a session management function (SMF) node or a PGW control plane function (PGW-C)) proximate to the wireless node; and establishing the voice traffic session using the network gateway.

BRIEF DESCRIPTION OF THE DRAWINGS

The disclosed examples are described below with reference to the accompanying drawing figures listed below, wherein.

Figure 1:
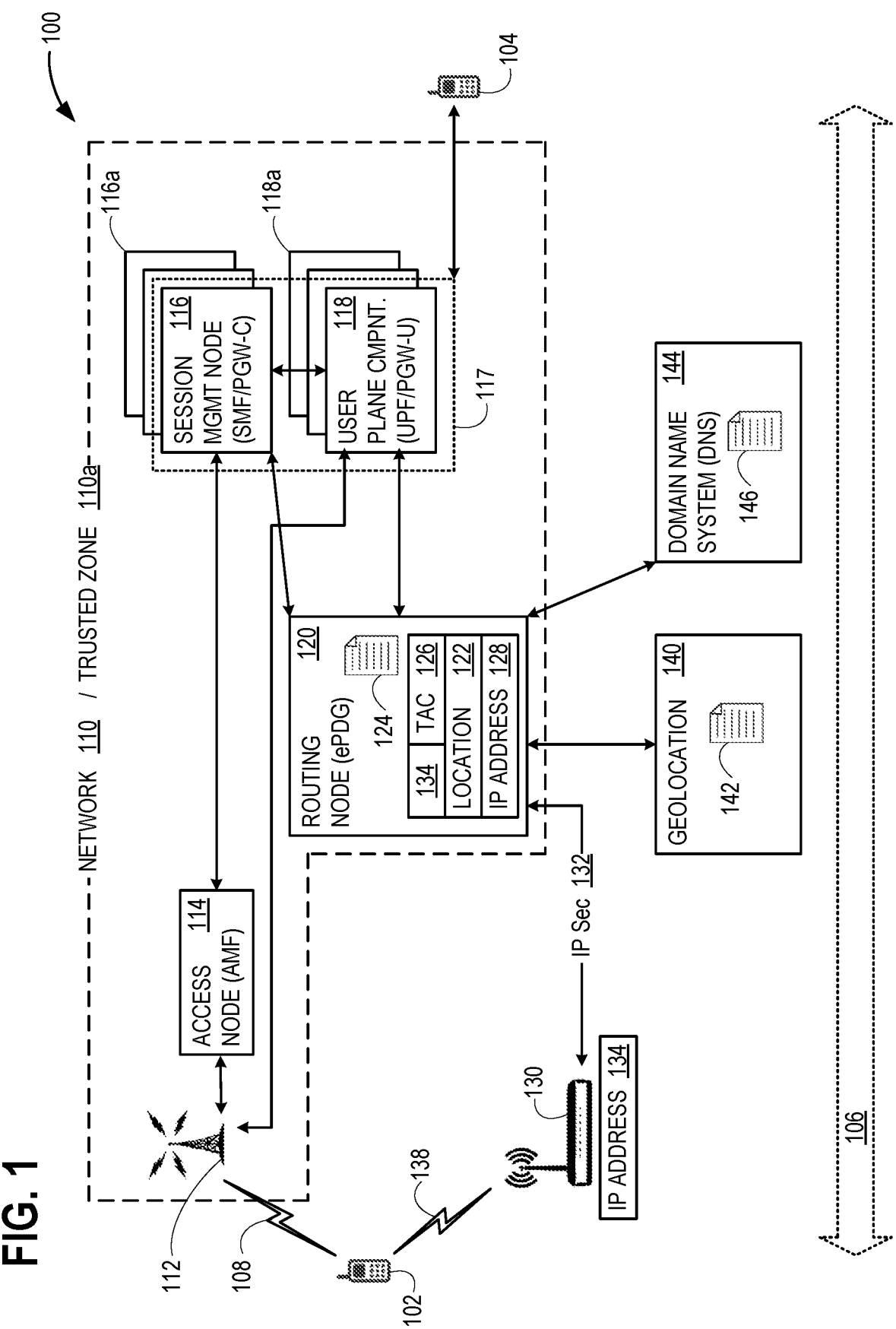
FIG. 1 illustrates an exemplary arrangement that may advantageously select a local gateway for a voice over WiFi (VoWiFi) and/or a video over WiFi (ViWiFi) call (a voice traffic session) for a user equipment (UE)

Corresponding reference characters indicate corresponding parts throughout the drawings. References made throughout this disclosure. relating to specific examples, are provided for illustrative purposes, and are not meant to limit all implementations or to be interpreted as excluding the existence of additional implementations that also incorporate the recited features.

DETAILED DESCRIPTION

A solution is disclosed for selecting local gateway for a voice over WiFi (VoWiFi) and/or a video over WiFi (ViWiFi) calls for a user equipment (UE). A solution includes: receiving, by a routing node (e.g., an evolved packet data gateway (ePDG)), a request to initiate the voice traffic session for the UE from a wireless node (e.g., a WiFi router) communicatively coupled with the UE, the wireless node outside a cellular network; based on at least an internet protocol (IP) address of the wireless node or the UE, determining a geographical location of the UE; based on at least the geographical location of the UE, determining a tracking area code; based on at least the tracking area code, determining an IP address of a network gateway (e.g., a user plane function (UPF) or a packet data gateway (PGW) user plane function (PGW-U), and a session management function (SMF) node or a PGW control plane function (PGW-C)) proximate to the wireless node; and establishing the voice traffic session using the network gateway.

Aspects of the disclosure improve the speed and reliability of cellular networks by determining a geographical location of a UE based on at least an IP address of the wireless node (e.g., a WiFi router) or the UE, determining a network gateway that is proximate to the wireless node (via a tracking area code), and establishing a voice traffic session (e.g., a VoWiFi or ViWiFi call) using that network gateway. Based on the IP address used by the UE on the WiFi network, an ePDG will be able to determine the approximate location of the UE using a geolocation server. In some examples, the UE will use an IP address obtained by the WiFi router, and the WiFi router will route VoWiFi or ViWiFi call traffic to/from the UE using network address translation (NAT). However, due to the relatively short range of WiFi local area networks (LANs), the UE may be expected to be physically nearby the WiFi router. Thus, determining the geographical location of the WiFi router is equivalent to determining the geographical location of the UE.

Before the ePDG selects a cellular network gateway, it will check a geolocation server (e.g., on the internet) to identify a tracking area code (TAC) that corresponds with the geographical location of the UE. The ePDG uses the tracking area code to identify an IP address of a nearby network gateway, which may include a user plane function (UPF) node and a session management function (SMF) node for 5G, or a packet data gateway (PGW) user plane function (PGW-U) node and a PGW control plane function (PGW-C) node for 4G. The IP address of the nearby network gateway may actually include two IP addresses, one for a control plane node (SMF or PGW-C) and one for a user plane node (UPF or PGW-U). In some examples, a domain name system (DNS) server is used to obtain the IP address of the nearby network gateway. In some examples, a network repository function (NRF) may be used to obtain the IP address of the nearby network gateway.

FIG. 1 illustrates an exemplary arrangement 100 that may advantageously select a local gateway for a VoWiFi and/or ViWiFi call (a voice traffic session 106) for a UE 102. Arrangement 100 includes a UE 102, which is placing a VoWiFi or ViWiFi call to a UE 104. UE 102 is initially communicatively coupled with wireless node 130 (e.g., a WiFi router) over an air interface 138. Wireless node 130 has an IP address 134, which may be shared with UE using NAT, and is outside cellular network 110. In some examples, IP address 134 may have been assigned by a DNS on the internet, rather than by cellular network 110. Therefore, wireless node 130 is outside a network trusted zone 110a and reaches network gateway 117 using an IPsec tunnel (e.g., a secure tunnel 132) to a routing node 120 (e.g., an ePDG), a request to initiate the voice traffic session 106 for UE 102 from wireless node 130 communicatively coupled with UE 102, wireless node 130 outside cellular network 110.

Network gateway 117 includes a session management node 116 (e.g., an SMF node or a PGW-C node) and a user plane component 118 (e.g., a UPF node or a PGW-U node). Cellular network 110 actually contains a plurality of geographically-dispersed network gateways, comprising a plurality of geographically-dispersed session management nodes 116a and a plurality of geographically-dispersed user plane components 118a. The challenge is for routing node 120 to select the correct network gateway (e.g., network gateway 117, comprising session management node 116 and user plane component 118) from the plurality of network gateways in cellular network 110. This way, voice traffic session 106 uses network gateway 117, which may be the same network gateway used (or at least nearby), when voice traffic session 106 is handed off from wireless node 130 to a radio access network (RAN) 112 of cellular network 110. After the hand-off, UE 102 will communicate with RAN 112 using an air interface 108, and reach network gateway 117 via an access node 114. In some examples, access node 114 comprises an access and mobility management function (AMF) node.

Figure 2:
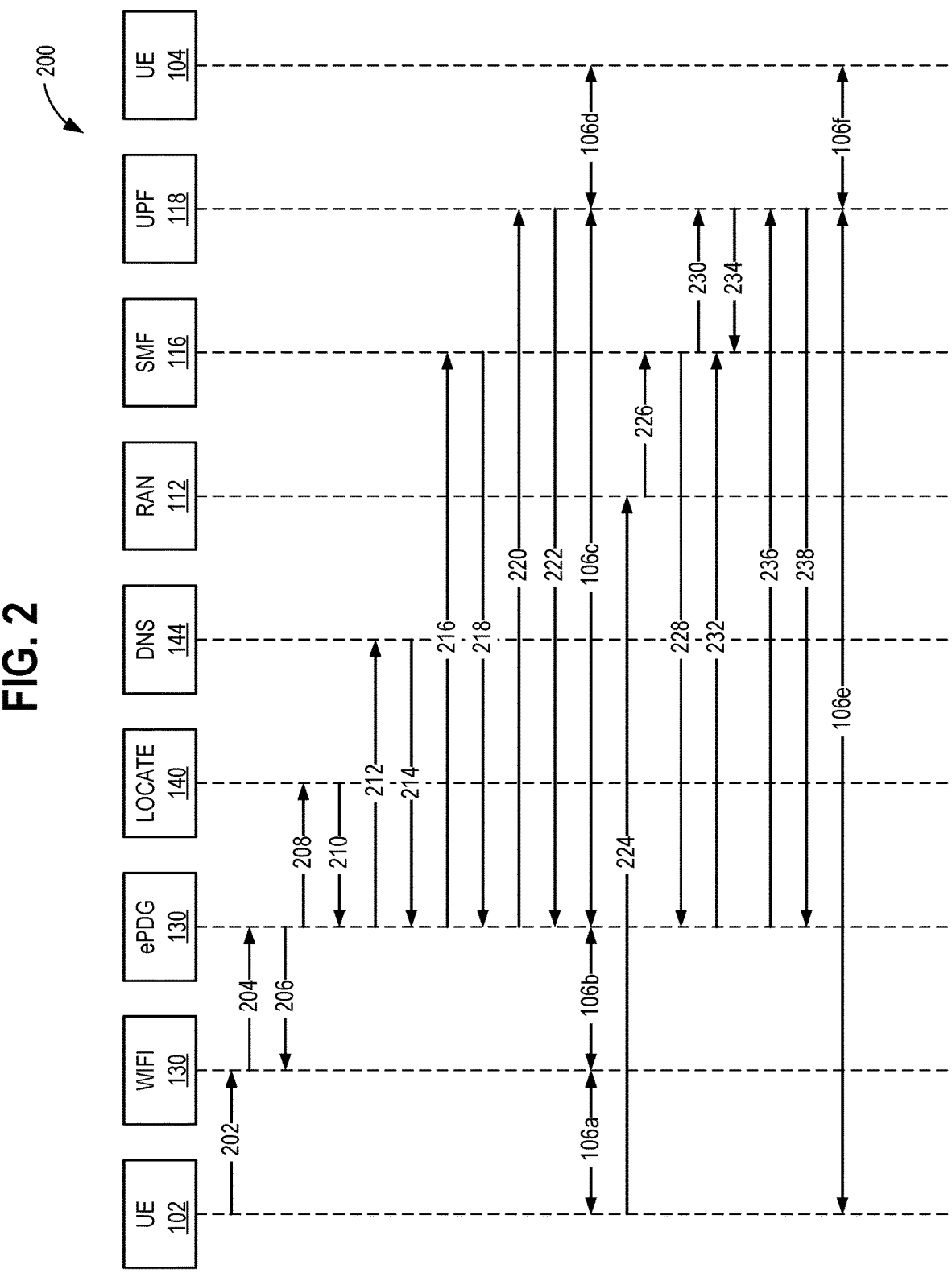
FIG. 2 illustrates a messaging sequence that may be used within the arrangement of FIG. 1.
Figure 3:
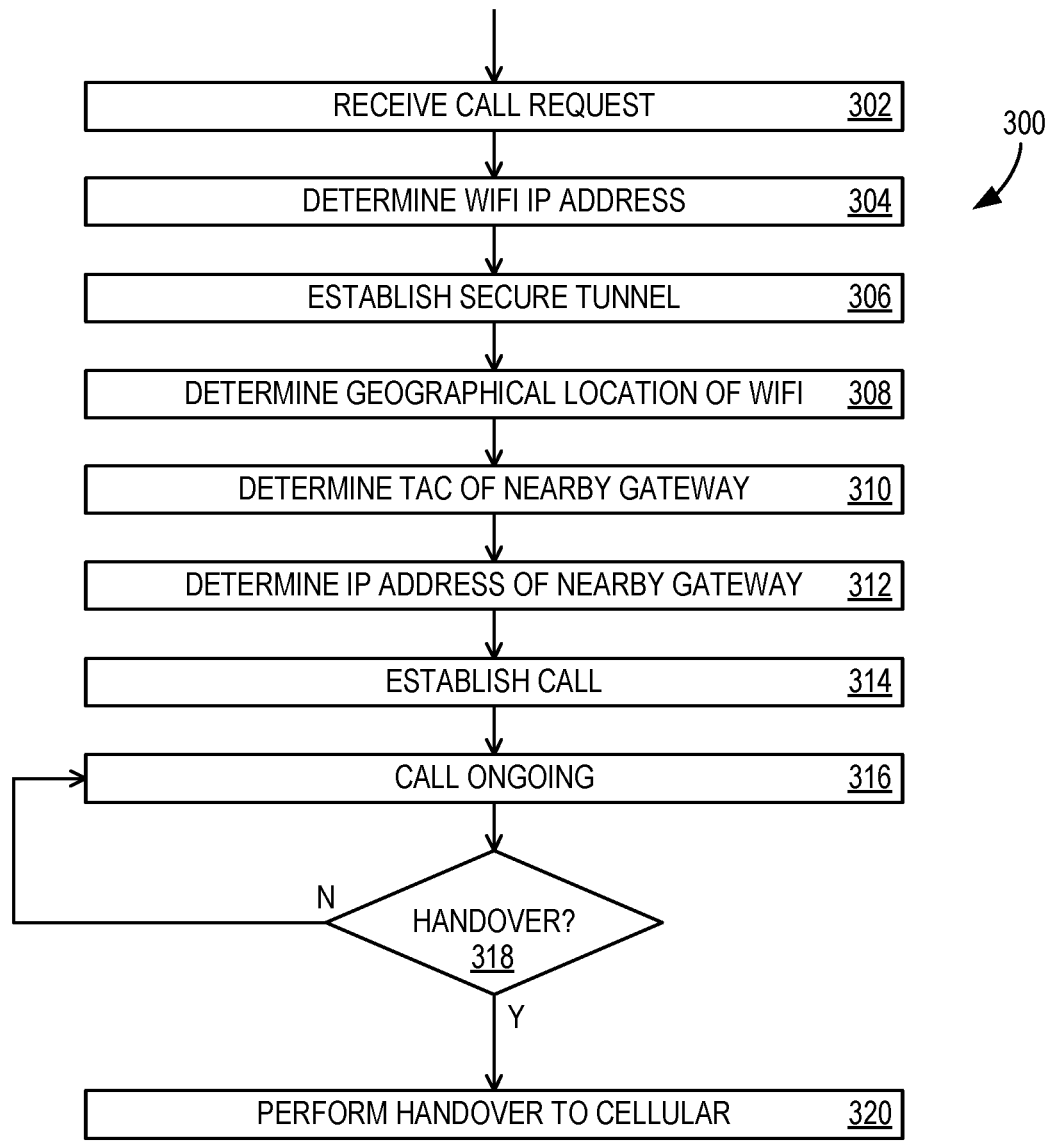
FIG. 3 illustrates a flowchart of exemplary operations associated with selecting a gateway for a voice traffic session for a UE.

Further description of FIG. 1 will be made with additional reference to FIGS. 2 and 3. FIG. 2 is a messaging sequence diagram 200 that shows a series of messages may be used within arrangement 100, and is described in conjunction with FIG. 3. FIG. 3 illustrates a flow chart 300 of exemplary operations associated with selecting a gateway for a voice traffic session for a UE. The messages of messaging sequence diagram 200 occur during various operations of flow chart 300. In some examples, at least a portion of messaging sequence diagram 200 and at least a portion of flow chart 300 may each be performed using one or more computing devices 500 of FIG. 5. FIGS. 1-3 should be viewed together.

UE 102 establishes a communication session with wireless node 130, using a message 202 (FIG. 2). Operation 302 includes receiving, by routing node 120, a request to initiate the voice traffic session 106 for UE 102 from wireless node 130, which is communicatively coupled with UE 102, and is outside cellular network 110. In some examples, voice traffic session 106 comprises a VoWiFi or a ViWiFi call. In some examples, routing node 120 comprises an ePDG. In some examples, wireless node 130 comprises a WiFi router. Operation 304 includes routing node 120 determining IP address 134 of wireless node 130 or UE 102 (which may be shared, for example, using NAT). Operation 306 includes establishing secure tunnel 132 between wireless node 130 and routing node 120. In some examples, routing node 120 comprises an interface between network trusted zone 110a and a node outside network trusted zone 110a. Wireless node 130 is outside network trust zone 110a.

In some examples, establishing a secure tunnel between wireless node 130 and routing node 120 uses an IPsec protocol. IPsec is a secure network protocol suite that authenticates and encrypts packets of data to provide secure encrypted communication between two nodes over an Internet Protocol network, for example to provide data authentication, integrity, and confidentiality. Operations 302-306 are represented, in an abbreviated form, by message 204 and message 206.

Operation 308 includes, based on at least IP address 134 (the IP address of wireless node 130 and/or UE 104) determining a geographical location 122 of UE 104. This is represented by message 208 and message 210, in which routing node 120 queries a geolocation server 140, which has a database 142 relating IP addresses with geographical locations. Operation 310 includes, based on at least geographical location 122 of UE 104, determining a tracking area code 126. A tracking area code (TAC) is a code set by cellular operators to define operating regions, and identify locations of network resources (e.g., network gateways). For example, a medium-sized metropolitan area may have three or four different tracking area codes, which divide the metropolitan area into a plurality of zones. In some examples, multiple network gateways may be assigned to a single tracking area code. In some examples, routing node 120 has a list 124 of tracking area codes with their geographical areas identified, and operation 310 includes routing node 120 searching list 124 to identify a specific tracking area code (e.g., tracking area code 126) that covers geographical location 122.

Operation 312 includes, based on at least the tracking area code 126, determining IP address 128 of network gateway 117 proximate to wireless node 130. In some examples, network gateway 117 comprises a UPF node or a PGW-U node (user plane component 118). In some examples, network gateway 117 further comprises an SMF node or a PGW-C node (session management node 116). In some examples, determining IP address 128 of network gateway 117 comprises querying DNS server 144, which has a list 146 correlating IP addresses with tracking area codes. For example, routing node 120 sends tracking area code 126 to DNS server 144, and DNS server 144 returns at least IP address 128 of network gateway 117 to routing node 120. In some examples, determining IP address of network gateway 117 comprises determining a first IP address of a UPF or a PGW-U and determining a second IP address of an SMF or a PGW-C. Operation 312 is represented by message 212 and message 214. Routing node 120 has thus obtained IP address 134, used IP address 134 to obtain geographical location 122, used geographical location 122 to obtain tracking area code 126, and used tracking area code 126 to learn IP address 128 of network gateway 117 that is proximate UE 102.

Operation 314 includes establishing voice traffic session 106 using network gateway 117. This is indicated with messages 216-222, in which routing node 120 communicates with session management node 116 and user plane component 118 to set up voice traffic session 106 for UE 102. The VoWiFi or ViWiFi phase of voice traffic session 106 is represented in FIG. 2 as messages 106a, 106b, 106c, and 106d, showing representative relay points. In some examples, voice traffic session 106 is relayed by a larger number of nodes than is illustrated. Operation 316 represents the ongoing VoWiFi or ViWiFi phase of voice traffic session 106.

A decision 318 determines whether a handover is to occur, or whether voice traffic session 106 remains as VoWiFi or ViWiFi. This may be triggered, for example, by UE establishing a communication session with RAN 112, which assigns UE 104 to session management node 116 (or another nearby session management node) to handle the cellular call traffic. This is indicated with message 224, from UE 102 to RAN 112, and message 226, from RAN 112 to session management node 116. When a handover to cellular does occur (e.g., UE uses RAN 112 rather than wireless node 130 for the voice or video call), operation 320 includes performing a handover of established voice traffic session 106 from wireless node 130 to RAN 112 of cellular network 110. This is indicated with messages 228-238. Session management node 116 alerts routing node 120 (message 228) and user plane component 118 (message 230), which both respond (messages 232 and 234) and, in some examples, routing node 120 also communicates with user plane component 118 (messages 236 and 238) to alert user plane component 118 that voice traffic session 106 will no longer be passed through routing node 120. The cellular phase of voice traffic session 106 is represented in FIG. 2 as messages 106a and 106f, showing representative relay points. In some examples, voice traffic session 106 is relayed by a larger number of nodes than is illustrated.

Figure 4:
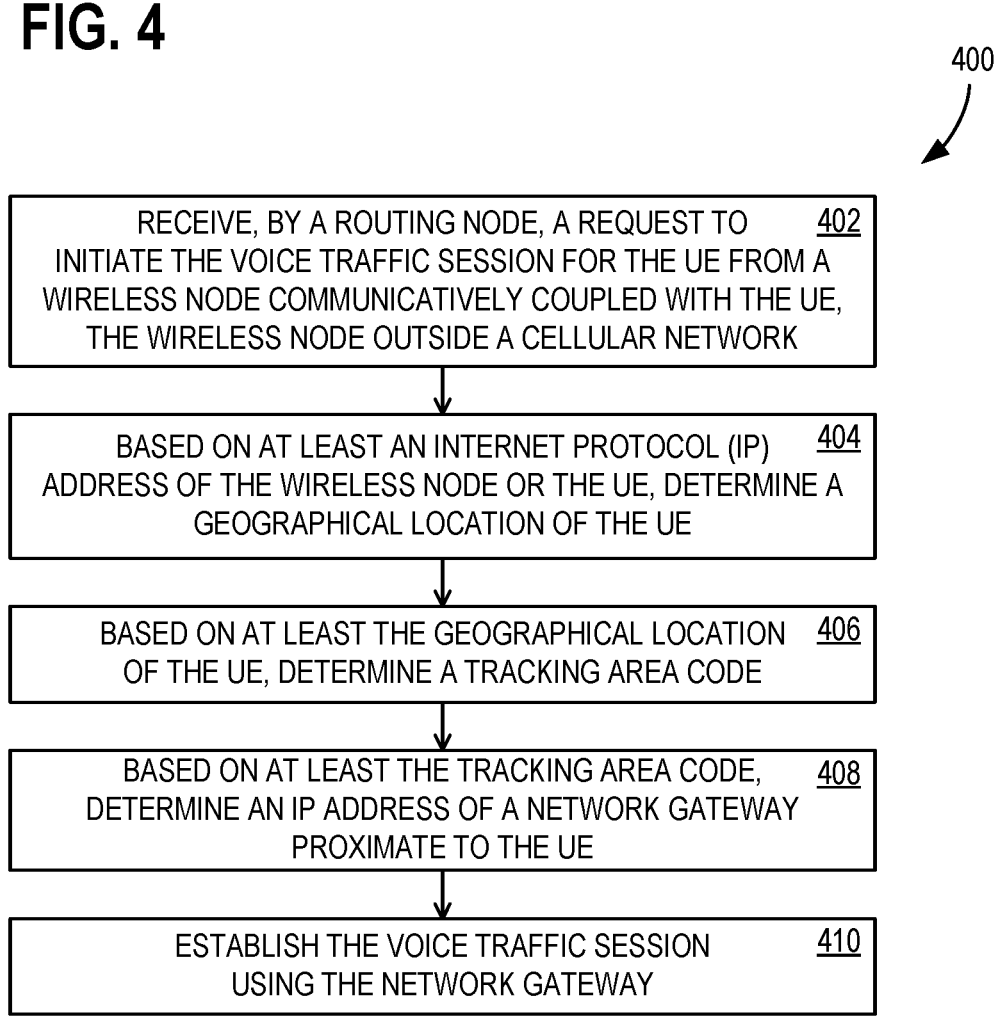
FIG. 4 illustrates another flowchart of exemplary operations associated with selecting a gateway for a voice traffic session for a UE.

FIG. 4 illustrates a flowchart 400 of exemplary operations associated with selecting a gateway for a voice traffic session for a UE. In some examples, at least a portion of flowchart 400 may be performed using one or more computing devices 500 of FIG. 5. Flowchart 400 commences with operation 402, which includes receiving, by a session management node, from an access node, a request for the voice traffic session for the UE. Operation 404 includes determining, by the session management node, a requested traffic type for the voice traffic session, wherein the requested traffic type comprises a first traffic type or a second traffic type (e.g., VoWiFi or ViWiFi). Operation 406 includes determining whether the session management node is connected to a first user plane function that can support the requested traffic type. Operation 408 includes, based on at least determining that the first user plane function can support the requested traffic type, establishing the requested voice traffic session for the UE using the first user plane function. Operation 410 includes, based on at least determining that the first user plane function cannot support the requested traffic type, connecting, by the session management node, to a second user plane function that can support the requested traffic type. Operation 412 includes, based on at least connecting to the second user plane function, establishing the requested voice traffic session for the UE using the second user plane function.

Figure 5:
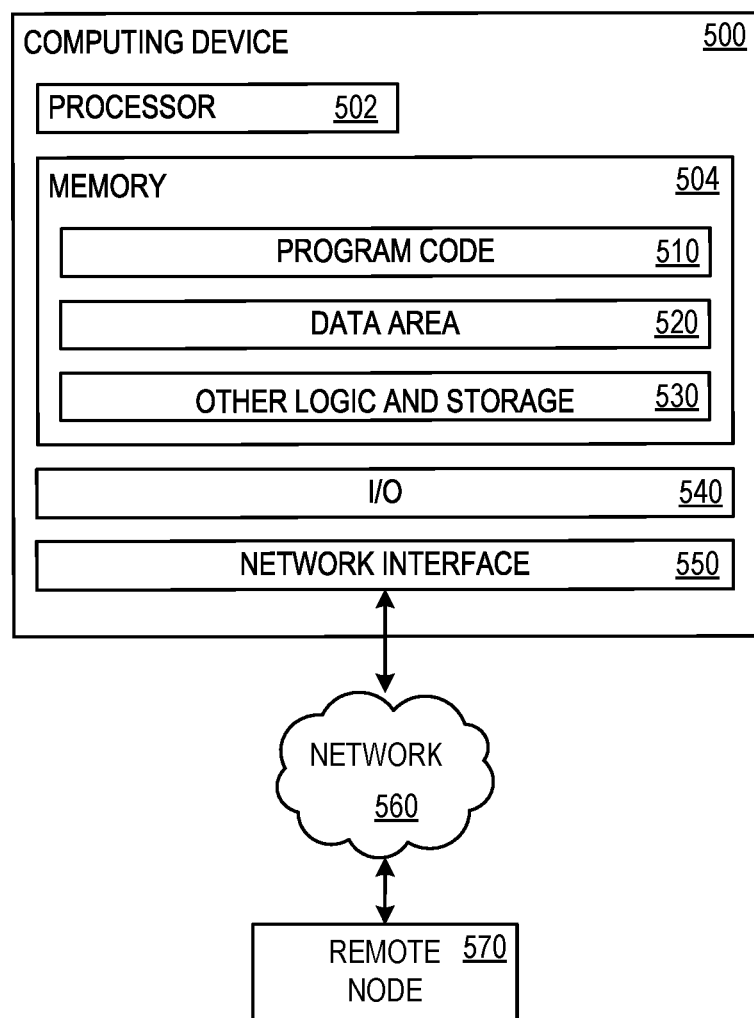
FIG. 5 illustrates a block diagram of a computing device that may be used as a component of the arrangement illustrated in FIG. 1.

FIG. 5 illustrates a block diagram of computing device 500 that may be used as a component of arrangement 100 of FIG. 1, for example, as any other component described herein that may require computational or storage capacity. Computing device 500 has at least a processor 502 and a memory 504 that holds program code 510, data area 520, and other logic and storage 530. Memory 504 is any device allowing information, such as computer executable instructions and/or other data, to be stored and retrieved. For example, memory 504 may include one or more random access memory (RAM) modules, flash memory modules, hard disks, solid-state disks, persistent memory devices, and/or optical disks. Program code 510 comprises computer executable instructions and computer executable components including any instructions necessary to perform operations described herein. Data area 520 holds any data necessary to perform operations described herein. Memory 504 also includes other logic and storage 530 that performs or facilitates other functions disclosed herein or otherwise required of computing device 500. An input/output (I/O) component 540 facilitates receiving input from users and other devices and generating displays for users and outputs for other devices. A network interface 550 permits communication over a network 560 with a remote node 570, which may represent another implementation of computing device 500. For example, a remote node 570 may represent another of the above-noted nodes within arrangement 100.

Additional Examples

An exemplary system for selecting a gateway for a voice traffic session for UE, the system comprises: a processor; and a computer-readable medium storing instructions that are operative upon execution by the processor to: receive, by a routing node, a request to initiate the voice traffic session for the UE from a wireless node communicatively coupled with the UE, the wireless node outside a cellular network; based on at least an IP address of the wireless node or the UE, determine a geographical location of the UE; based on at least the geographical location of the UE, determine a tracking area code; based on at least the tracking area code, determine an IP address of a network gateway proximate to the UE; and establish the voice traffic session using the network gateway.

An exemplary method of selecting a gateway for a voice traffic session for a UE comprises: receiving, by a routing node, a request to initiate the voice traffic session for the UE from a wireless node communicatively coupled with the UE, the wireless node outside a cellular network; based on at least an IP address of the wireless node or the UE, determining a geographical location of the UE; based on at least the geographical location of the UE, determining a tracking area code; based on at least the tracking area code, determining an IP address of a network gateway proximate to the UE; and establishing the voice traffic session using the network gateway.

One or more exemplary computer storage devices has computer-executable instructions stored thereon for selecting a gateway for a voice traffic session for a UE, which, on execution by a computer, cause the computer to perform operations comprising: receiving, by a routing node, a request to initiate the voice traffic session for the UE from a wireless node communicatively coupled with the UE, the wireless node outside a cellular network; based on at least an IP address of the wireless node or the UE, determining a geographical location of the UE; based on at least the geographical location of the UE, determining a tracking area code; based on at least the tracking area code, determining an IP address of a network gateway proximate to the UE; and establishing the voice traffic session using the network gateway.

Alternatively, or in addition to the other examples described herein, examples include any combination of the following:

the voice traffic session comprises a VoWiFi or a ViWiFi call;

determining the IP address of the network gateway comprises querying a DNS server;

the routing node comprises an interface between a network trusted zone and a node outside the network trusted zone;
the wireless node is outside the network trust zone;
establishing a secure tunnel between the wireless node and the routing node;
the routing node comprises an ePDG;
the wireless node comprises a WiFi router;
the network gateway comprises a UPF node or a PGW-U node;
the network gateway further comprises an SMF node or a PGW-C node;
performing a handover of the established voice traffic session from the wireless node to a RAN of the cellular network;
determining the IP address of the wireless node;
determining the IP address of the UE;
establishing a secure tunnel between the wireless node and the routing node using IP security (IPsec) protocol; and
determining an IP address of a network gateway proximate to the UE comprises determining a first IP address of a UPF or a PGW-U and determining a second IP address of an SMF or a PGW-C.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of"

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of selecting a gateway for a voice traffic session for a user equipment (UE), the method comprising:
receiving, by a routing node, a request to initiate the voice traffic session for the UE over a wireless network from a wireless node communicatively coupled with the UE;
based on at least an internet protocol (IP) address of the wireless node communicatively coupled with the UE, determining a geographical location of the UE;
based on at least the geographical location of the UE, determining a tracking area code;
based on at least the tracking area code, determining an IP address of a network gateway proximate to the UE; and
establishing the voice traffic session using the network gateway, wherein the routing node comprises an interface between a network trusted zone and a node outside the network trusted zone, and wherein the wireless node is outside the network trusted zone.

2. The method of claim 1, wherein the voice traffic session comprises a voice over WiFi (VoWiFi) or a video over WiFi (ViWiFi) call.

3. The method of claim 1, wherein determining the IP address of the network gateway comprises querying a domain name system (DNS) server.

4. The method of claim 1, further comprising:
establishing a secure tunnel between the wireless node and the routing node.

5. The method of claim 1,
wherein the routing node comprises an evolved packet data gateway (ePDG);
wherein the wireless node comprises a WiFi router;
wherein the network gateway comprises a user plane function (UPF) node or a packet data gateway (PGW) user plane function (PGW-U) node; and
wherein the network gateway further comprises a session management function (SMF) node or a PGW control plane function (PGW-C) node.

6. The method of claim 1, further comprising:
performing a handover of the established voice traffic session from the wireless node to a radio access network (RAN) of the cellular network.

7. A system for selecting a gateway for a voice traffic session for a user equipment (UE), the system comprising:
a processor; and
a computer-readable medium storing instructions that are operative upon execution by the processor to:
receive, by a routing node, a request to initiate the voice traffic session for the UE over a wireless network from a wireless node communicatively coupled with the UE;
based on at least an interne protocol (IP) address of the wireless node communicatively coupled with the UE, determine a geographical location of the UE;
based on at least the geographical location of the UE, determine a tracking area code;
based on at least the tracking area code, determine an IP address of a network gateway proximate to the UE; and
establish the voice traffic session using the network gateway, wherein the routing node comprises an interface between a network trusted zone and a node outside the network trusted zone, and wherein the wireless node is outside the network trusted zone.

8. The system of claim 7, wherein the voice traffic session comprises a voice over WiFi (VoWiFi) or a video over WiFi (ViWiFi) call.

9. The system of claim 7, wherein determining the IP address of the network gateway comprises querying a domain name system (DNS) server.

10. The system of claim 7, wherein the operations are further operative to:
establish a secure tunnel between the wireless node and the routing node.

11. The system of claim 7,
wherein the routing node comprises an evolved packet data gateway (ePDG);
wherein the wireless node comprises a WiFi router;
wherein the network gateway comprises a user plane function (UPF) node or a packet data gateway (PGW) user plane function (PGW-U) node; and wherein the network gateway further comprises a session management function (SMJF) node or a PGW control plane function (PGW-C) node.

12. The system of claim 7, wherein the operations are further operative to:
perform a handover of the established voice traffic session from the wireless node to a radio access network (RAN) of the cellular network.

13. One or more computer storage devices having computer-executable instructions stored thereon for selecting a gateway for a voice traffic session for a user equipment (UE), which, on execution by a computer, cause the computer to perform operations comprising:
receiving, by a routing node, a request to initiate the voice traffic session for the UE over a wireless network from a wireless node communicatively coupled with the UE;
based on at least an internet protocol (IP) address of the wireless node communicatively coupled with the UE, determining a geographical location of the UE;
based on at least the geographical location of the UE, determining a tracking area code;
based on at least the tracking area code, determining an IP address of a network gateway proximate to the UE; and
establishing the voice traffic session using the network gateway, wherein the routing node comprises an interface between a network trusted zone and a node outside the network trusted zone, and wherein the wireless node is outside the network trusted zone.

14. The one or more computer storage devices of claim 13, wherein the voice traffic session comprises a voice over WiFi (VoWiFi) or a video over WiFi (ViWiFi) call.

15. The one or more computer storage devices of claim 13, wherein determining the IP address of the network gateway comprises querying a domain name system (DNS) server.

16. The one or more computer storage devices of claim 13, wherein the operations further comprise:
establishing a secure tunnel between the wireless node and the routing node.

17. The one or more computer storage devices of claim 13,
wherein the routing node comprises an evolved packet data gateway (ePDG);
wherein the wireless node comprises a WiFi router;
wherein the network gateway comprises a user plane function (UPF) node or a packet data gateway (PGW) user plane function (PGW-U) node; and
wherein the network gateway further comprises a session management function (SMF) node or a PGW control plane function (PGW-C) node.

* * * * *